3 Sheets—Sheet 1.

J. JONES.

RAILWAY CROSSING.

No. 11,159. Reissued Apr. 28, 1891.

Witnesses:
Henry Drury
Jesse Heller

Inventor:
John Jones
by his atty
Francis T. Chambers

THE NORRIS PETERS CO., PHOTO-LITHO., WASHINGTON, D. C.

3 Sheets—Sheet 2.

J. JONES.

RAILWAY CROSSING.

No. 11,159. Reissued Apr. 28, 1891.

Witnesses:
Henry Drury
Jesse Heller

Inventor:
John Jones
by his atty.
Francis T. Chambers.

THE MORRIS PETERS CO., PHOTO-LITHO., WASHINGTON, D. C.

J. JONES.

RAILWAY CROSSING.

No. 11,159. Reissued Apr. 28, 1891.

Witnesses:
Henry Drury
Jesse Heller

Inventor:
John Jones
by his atty
Francis T. Chambers

THE NORRIS PETERS CO., PHOTO-LITHO., WASHINGTON, D. C.

UNITED STATES PATENT OFFICE.

JOHN JONES, OF ELKHART, INDIANA.

RAILWAY-CROSSING.

SPECIFICATION forming part of Reissued Letters Patent No. 11,159, dated April 28, 1891.

Original No. 425,803, dated April 15, 1890. Application for reissue filed December 4, 1890. Serial No. 373,618.

*To all whom it may concern:*

Be it known that I, JOHN JONES, a citizen of the United States, residing in the city of Elkhart, in the county of Elkhart, in the State of Indiana, have invented certain new and useful Improvements in Railway-Crossings, of which the following is a specification.

My invention relates to improvements in a railway-crossing, in which two rails are connected together and pivoted at the point of intersection of two tracks, so as to be changed from one track to the other, to be used upon either as required, in combination with a device by which distant signals are interlocked with the crossing; and the objects of this invention are to give a smooth track and perfect safety for the passage of trains running at high speed upon one track across another, both tracks being upon the same plane. I attain these objects by mechanism illustrated in the accompanyiny drawings.

Figure 1:
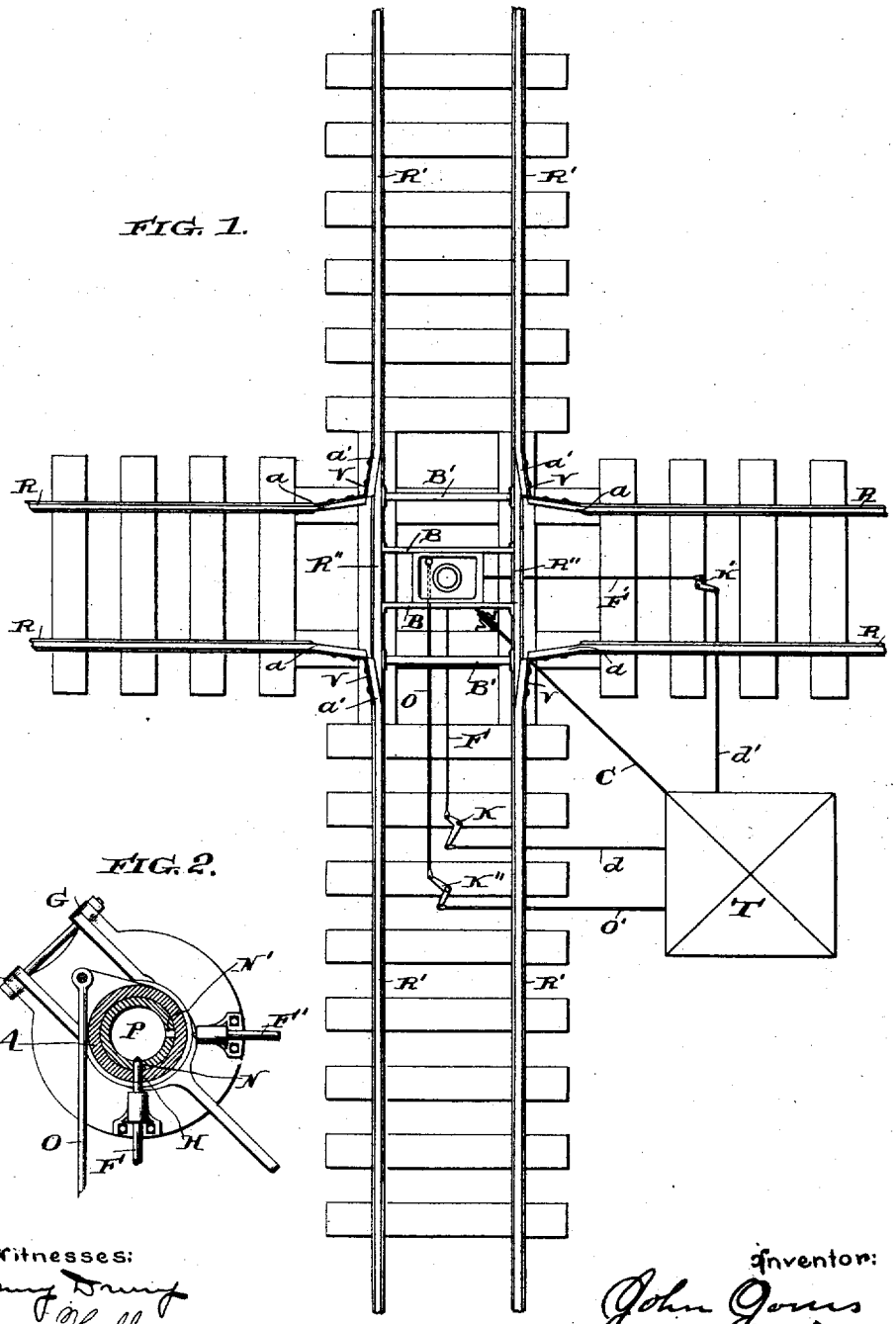
Figure 2:
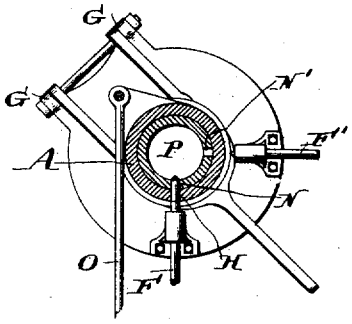
Figure 3:
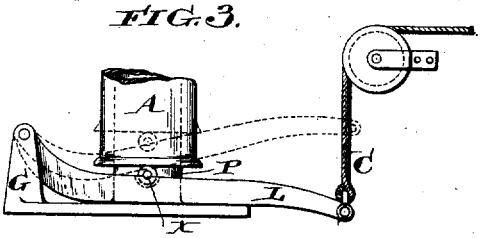
Figure 4:
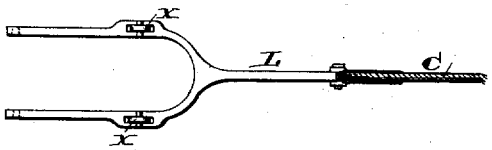
Figure 5:
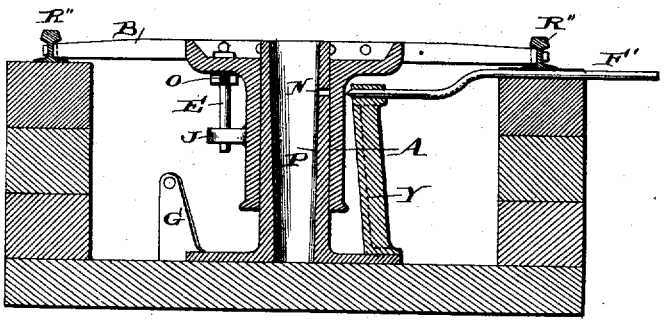
Figure 6:
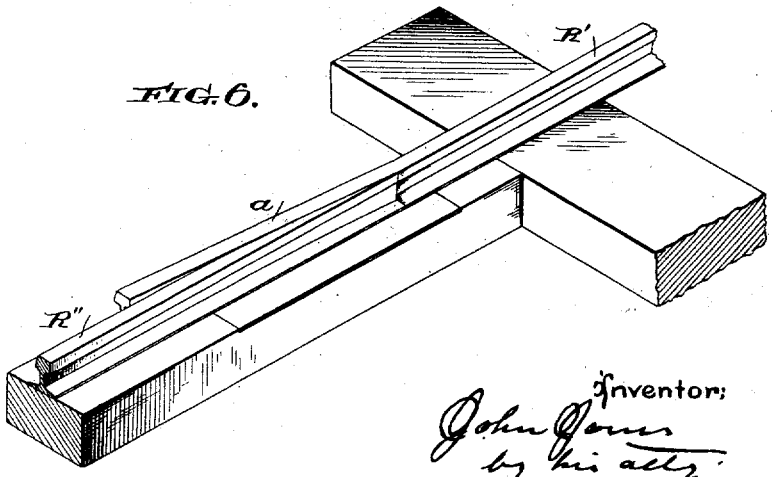
Figure 7:
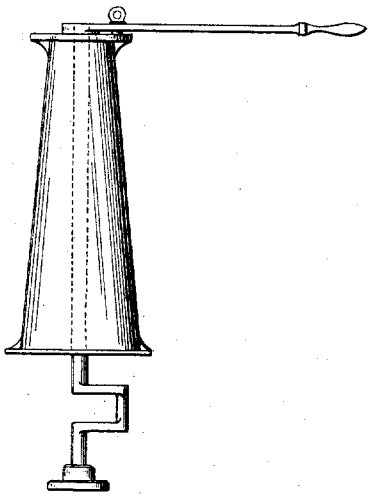
Figure 8:
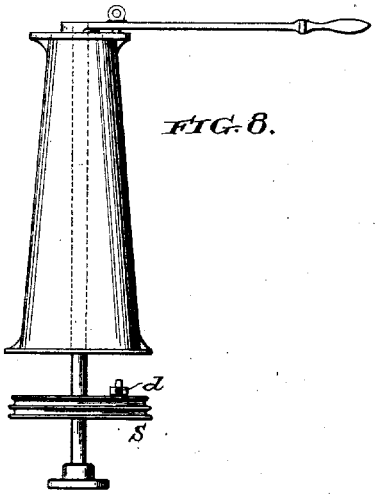
Figure 9:
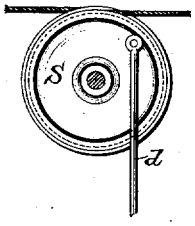
Figure 10:
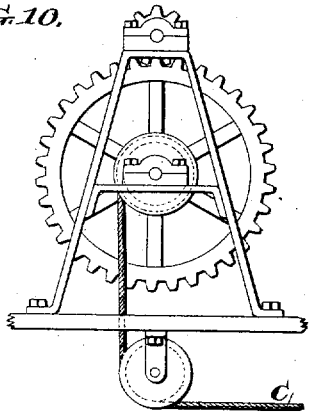
Figure 11:
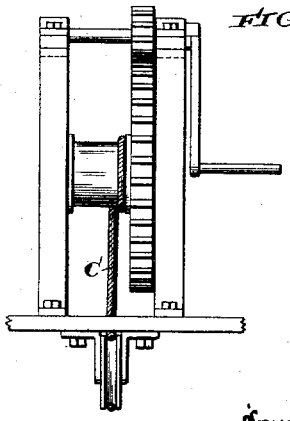

Figure 1 is a plan view of a crossing of two railways, showing my improvements in position. Fig. 2 is a sectional plan of the center of the crossing, showing the mechanism for lifting and turning the crossing and interlocking the distant signals. Fig. 3 is an elevation of the lower part of the center post and the sleeve which rotates about it, showing a lever with friction-rollers for lifting the crossing above the top of the permanent rails and lowering it into position for trains to cross, the dotted lines showing the position of the lever when the crossing is up. Fig. 4 is a plan of the lever with the friction-rollers. Fig. 5 is a vertical section, showing the center post and the rotating sleeve and the manner of fastening the rails to the rotating sleeve and one of the interlocking bolts and its guide-post. Fig. 6 is a perspective view of the joint formed by the permanent rails of the track and the rails of the crossing when in position for trains to cross. Fig. 7 is a stand with lever and crank for rotating the crossing. Fig. 8 is a similar stand with lever and sheave and cable for operating distant signals, two of which should be used, one for each track. Fig. 9 is a plan of the sheave with cable, showing the interlocking-bolt connected to the sheave by the rod *d*. Figs. 10 and 11 are side and end views of an ordinary windlass for lifting the crossing and lowering it into position for trains to cross by means of the cable C.

Similar letters refer to similar parts in all the figures.

In the drawings, R R represent the permanent rails of one track; R′ R′, the permanent rails of the other, whose ends are bent outward and connected together by the straps V, as shown at *a a* and *a′ a′* in Fig. 1.

R″ R″ represent the pivoted rails of the crossing, which are secured to the central rotating sleeve A, and are held the proper distance apart by the braces B B and B′ B′, the rails R″ R″ being planed or cut off at each end at an angle to coincide with the bent ends of the rails R R and R′ R′, as shown at *a′ a′* in Figs 1 and 6. The rails R″ R″ when in position for a train to cross are down between the bent ends of the rails R R or R′ R′, as may be required, and are supported laterally by the permanent rails, and resting their entire length upon the timber below form a smooth and continuous track without butt-joints across the intersecting track.

L in Fig. 3 represents the lever under the lower edge of the sleeve A, the forked end pivoted to the lugs G on the base-plate of the post P.

O represents the rod for rotating the crossing from one position to the other.

E represents the bolt by which the rod O is connected to the sleeve A.

J is a lug on the sleeve A to support the lower end of the bolt E.

F and F′ represent the bolts by which the distant signals are interlocked with the crossing, so that neither signal can be changed from "danger" till the crossing is in position for a train to cross. Then the signals for the track which is connected can be changed to show "clear." Then the crossing is locked so that it cannot be lifted and the signals for the other track are locked at "danger." The manner of doing this is as follows: When the crossing is lowered into the position shown in Fig. 1, the hole H in the sleeve A (shown in Fig. 2) is brought into line with the hole N in the post P, about which the sleeve A rotates, and allows the bolt F′ to pass through the outer sleeve A and into the post P, as the signals are set at "clear" by the movement of the sheave S, Fig. 9, motion being transmitted to the bolt F by the rod *d* through the bell-crank K, and the bolt F′ having been previously withdrawn and motion being transmitted through the bell-crank K′ by the rod *d*′, which sets the signals for the track R R at "danger", to allow the crossing to be changed from R R to R′ R′, and are held there by the sleeve A covering the hole N′ in the post P, as shown in Fig. 2, thus preventing the crossing from being lifted or the danger-signals for the track R R being changed till the danger-signals are set for the track R′ R′.

T in Fig. 1 is the tower or house from which the crossing and signals are operated.

Having now described my invention, what I claim as new, and desire to secure by Letters Patent, is—

1. In a railway-crossing, the combination of the intersecting tracks, the rails of which are flared or spread for a short distance in advance of their points of intersection and intermitted at the crossing, with the pivoted rails R″ R″, securely braced together and having their ends cut to fit in and fill the flare formed at the ends of the permanent rails, all substantially as specified, and so that the pivoted rails will rest on the road-bed which supports the permanent rails and be supported laterally by said permanent rails.

2. In a railway-crossing, the combination of the intersecting tracks, the rails of which are flared or spread for a short distance in advance of their points of intersection and intermitted at the crossing, with the pivoted rails R″ R″, securely braced together and having their ends cut to fit in and fill the flare formed at the ends of the permanent rails, and means, substantially as described, for giving said rails R″ R″ vertical and rotary movement around their pivot, all substantially as and for the purpose specified.

3. In a railway-crossing, the combination of the sleeve A with the rails R″ R″, the post P, the lever L, and rod O, for lifting and turning the rails R″ R″, substantially as described, and for the purpose specified.

4. In a railway-crossing, the combination of the rails R″ R″, the braces B B, the sleeve A, the hole H in the sleeve A, and the holes N and N′ in the post P with the bolts F and F′, connected to the mechanism by which distant signals are operated for interlocking the crossing and signals, substantially as described.

JOHN JONES.

Witnesses:
JAMES H. STATE,
CHARLES H. WATSON.